US011863457B2

(12) United States Patent
Raindel

(10) Patent No.: US 11,863,457 B2
(45) Date of Patent: Jan. 2, 2024

(54) TIME-SENSITIVE DATA DELIVERY IN DISTRIBUTED COMPUTING SYSTEMS

(71) Applicant: Microsoft Technology Licensing, LLC, Redmond, WA (US)

(72) Inventor: Shachar Raindel, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 220 days.

(21) Appl. No.: 17/117,819

(22) Filed: Dec. 10, 2020

(65) Prior Publication Data
US 2022/0191148 A1 Jun. 16, 2022

(51) Int. Cl.
| | |
|---|---|
| H04L 47/283 | (2022.01) |
| H04L 47/32 | (2022.01) |
| H04L 67/1095 | (2022.01) |
| H04L 69/22 | (2022.01) |

(52) U.S. Cl.
CPC ........... *H04L 47/283* (2013.01); *H04L 47/32* (2013.01); *H04L 67/1095* (2013.01); *H04L 69/22* (2013.01)

(58) Field of Classification Search
CPC ... H04L 47/32; H04L 47/283; H04L 67/1095; H04L 69/22
See application file for complete search history.

(56) References Cited

U.S. PATENT DOCUMENTS

| | | | |
|---|---|---|---|
| 7,065,482 B2 | 6/2006 | Shorey et al. | |
| 7,542,430 B2 | 6/2009 | Lin et al. | |
| 7,860,932 B2 | 12/2010 | Fried | |
| 8,208,389 B2 | 6/2012 | Alaria et al. | |
| 8,325,764 B2 | 12/2012 | Frink et al. | |
| 8,345,668 B2 | 1/2013 | Nakayama et al. | |
| 9,030,931 B2 | 5/2015 | Duda et al. | |
| 2006/0155729 A1* | 7/2006 | Aahlad | ................ G06F 16/182 |
| 2007/0226810 A1* | 9/2007 | Hotti | ................... H04L 67/1095 |
| | | | 726/30 |
| 2014/0064293 A1* | 3/2014 | Deisinger | ............... G06F 9/545 |
| | | | 370/412 |

(Continued)

FOREIGN PATENT DOCUMENTS

CN 110636130 A 12/2019

OTHER PUBLICATIONS

"International Search Report and Written Opinion Issued in PCT Application No. PCT/US21/058502", dated Mar. 18, 2022, 11 Pages.

(Continued)

*Primary Examiner* — Melanie Jagannathan
(74) *Attorney, Agent, or Firm* — Newport IP, LLC; Han K. Gim

(57) ABSTRACT

Techniques of time-sensitive data delivery in distributed computing systems are disclosed herein. In one example, a server can disseminate the same information to multiple endpoints in a distributed computing system by transmitting multiple packets to the multiple endpoints hosted on additional servers in the distributed computing system. The multiple packets individually include a header field containing a delivery time before which the packets are not forwarded to corresponding final destinations and a payload containing data representing copies of information identical to one another destined to the multiple endpoints hosted on the additional servers.

18 Claims, 10 Drawing Sheets

(56) References Cited

U.S. PATENT DOCUMENTS

2015/0019686 A1* 1/2015 Backholm ............... H04L 67/01
                                                     709/217
2016/0212206 A1* 7/2016 Wu ................... H04L 43/0876
2017/0264579 A1   9/2017 Fang et al.
2019/0163545 A1   5/2019 Singh et al.
2019/0327129 A1* 10/2019 Higuchi ............. H04L 43/0817

OTHER PUBLICATIONS

Choi, et al., "End-to-End Latency Prediction for General-Topology Cut-Through Switching Networks", In Journal of IEEE Access, vol. 8, Jan. 13, 2020, pp. 13806-13820.

Saied, Khalid Omer Mahgoub, "Network Latency Estimation Leveraging Network Path Classification", In Thesis of Master Science in Information and Technology, Royal Institute of Technology, May 2018, 111 Pages.

* cited by examiner

TIME-SENSITIVE DATA DELIVERY IN DISTRIBUTED COMPUTING SYSTEMS

BACKGROUND

Distributed computing systems typically include routers, switches, bridges, and other types of network devices that interconnect large numbers of servers, network storage devices, or other computing devices. The individual servers can host one or more virtual machines ("VMs"), containers, virtual switches, or other virtualized functions. The virtual machines or containers can facilitate execution of suitable applications for individual users to provide to the users desired cloud services or other suitable computing services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In datacenters or other large-scale distributed computing systems, computing resources such as virtual machines, containers, or applications can be provisioned for different users to execute applications. For instance, a source virtual machine of an online marketplace (e.g., a stock exchange, a currency exchange, a mercantile exchange, an online auction platform, etc.) can execute an application to provide a computing service that monitors online trading/bidding and distribute price data to multiple users subscribing to the information. As such, the source virtual machine can be configured to continuously, upon event (e.g., detection of a trade or bid), or periodically transmit price data to various other virtual machines or containers in the distributed computing system via a computer network that interconnects servers hosting the multiple virtual machines, containers, or applications. The other virtual machines, containers, or applications can then surface the transmitted price data to users for consumption and action.

In the foregoing scenario, the price data of trades or bids can fluctuate constantly. As such, to have an earlier access to the price data than others can be a great advantage for a user to act on such information. Such an advantage, however, may be unfair to the other users and not conducive to maintaining an efficient market. In order to provide the same price data to all the users at the same time, online marketplaces often deploy dedicated servers at precise physical and/or network communication distance to servers of the subscribing users. For example, the designated servers can be connected to servers of the subscribing users with cables of the same length and specification. Thus, the price data transmitted to the servers of the subscribing users can arrive at the same or within a tolerance of time.

The arrangement of using dedicated servers, however, may not be available when applications and related computing services are migrated to cloud-based computing platforms. A cloud-computing datacenter typically include thousands if not millions of servers or hosts interconnected via a computer network. Different servers or hosts can be dynamically provisioned to execute applications based on workload, execution priority, resource availability, or other suitable criteria. As such, maintaining a constant physical and/or network communication distance between the different servers may be impractical. Consequently, the users subscribing to the related computing services may experience communication latency variations. Thus, some users may receive the price data before others, thereby unfairly disadvantage the other users.

Several embodiments of the disclosed technology can address certain aspects of the foregoing difficulties by implementing a source-configured delivery time mandate for packets containing the same time-sensitive data delivered from a source (e.g., an online marketplace) to multiple destinations or endpoints in a distributed computing system. In one implementation, packets can be configured to include a delivery time field in a preamble of the packets. The delivery time field can be configured to contain data representing a delivery time at which the packets or payloads of the packets are allowed to be accessed by a final destination, such as a virtual machine or container hosted on the server, as identified in, for example, a destination IP address field, a media access control ("MAC") address, or other suitable network address filed of the packets. In other embodiments, the delivery time field can be included in a midamble, suffix, or other portions of the packets.

Upon receiving the packets, destination servers (or a component thereof) can individually inspect the data included in the delivery time field of the packets to identify a delivery time. In certain embodiments, the identified delivery time at all of the destination servers can be the same. In other embodiments, one of the servers can have an identified delivery time that is different than others to accommodate a clock drift or for other suitable reasons. In further embodiments, the delivery times can be spaced such that the final destinations at various servers receive the time-sensitive information in a tiered or in other manners according to, for instance, a subscription or priority level.

The destination servers can also be configured to determine whether the identified delivery time indicated by the data in the delivery time field has expired when compared to, for instance, a local system time, a platform system time, or other suitable standard time. When the local system time is used, the destination servers can be configured to synchronize the local system time according to the Network Time Protocol, Precision Time Protocol, or other suitable protocols. The time synchronization can be based on a remote reference clock (e.g., a clock at a Global Positioning System or GPS receiver) or other suitable types of reference clocks.

In response to determining that the delivery time has expired, the destination servers can be configured to forward the packets or payloads of the packets to the final destinations or otherwise allow access to the information contained in the packets by the final destination immediately. The destination servers can also be configured to optionally transmit a report to the source server, the final destination (e.g., a virtual machine or container), a monitoring environment (e.g., a platform or cluster controller), or other suitable entities indicating that the packets have arrived "late," i.e., after the delivery time has expired and request the source server to adjust the delivery time for future packets.

On the other hand, in response to determining that the delivery time has not expired, the destination servers can be configured to temporarily store the packets, the payloads of the packets, or other suitable portions of the packets in a buffer until the delivery time indicated in the delivery time field expires. The buffer can include a physical and/or virtual storage in a network interface card ("NIC"), a Field Programmable Gate Array ("FPGA") coupled to the NIC, a hypervisor, an operating system on the destination servers, a network component (e.g., a switch) connected to the destination servers, or a combination thereof. In other embodiments, instead of storing the packets or portions thereof, additional data (e.g., a decryption key) needed to access information contained in the packets may be temporarily stored in the buffer. Upon expiration of the delivery time, access to the information contained in the packets can then be allowed. In yet other embodiments, an identifier of the packet may be stored in the buffer, and a platform key may be used to derive the decryption key for decrypting the packet. In further embodiments, the destination servers can provide a decryption facility to decrypt the packet. During operation, the final destination, e.g., a virtual machine can present the packet with the delivery time to the decryption facility. In turn, the decryption facility can be configured to decrypt and provide the virtual machine access to the information in the packet only after expiration of the delivery time.

In certain embodiments, the destination servers can also be configured to determine a difference between the delivery time indicated in the delivery time field of the packets and a local or platform system time at which the packets were received. The destination servers can then compare the determined difference with a delay threshold. When the difference equals or exceeds the delay threshold, the destination servers can be configured to transmit a notification to the source server indicating that a "long" delay between reception and forwarding of the packets to the final destinations is detected. In other embodiments, the destination servers can also be configured to report the determined difference to the source server or a monitoring environment irrespective of whether a long delay is detected. In further embodiments, the difference can be reported only in response to the difference is above the delay threshold. Though the delivery time verification operations are described above in the context of the destination server, in other implementations, at least a portion of the foregoing operations can also be implemented on a network component (e.g., a switch) that is connected to the destination server.

The source server can be configured to set the delivery time in various ways in order to achieve simultaneous or near simultaneous (e.g., within 0.001 millisecond) delivery of the packets and associated payloads containing the same time-sensitive data to the final destinations. In one embodiment, a delivery controller at the source server (or other suitable locations in the distributed computing system) can be configured to calculate a value of the delivery time based on a current time at the source server and an estimated maximum latency of communicating with all the destination servers. For instance, the delivery controller can periodically transmit test packets (e.g., pings) to the various destination servers and record latency values between transmitting the test packets and receiving a response in return. The delivery controller can also record values such as round-trip time when establishing network connections with the destination servers or determine latency values to the destination servers in other suitable manners.

Based on the recorded historical latency data, the source server can be configured to select a maximum latency corresponding to one or more of the destination servers and set the delivery time to be a current time plus the maximum latency and optionally a safety factor, as follows:

Delivery time=Current time+Maximum latency+Safety factor

The safety factor can be 0%, 10%, 20%, or other suitable proportions of the largest latency or can be a fixed or adjustable time value (e.g., 1 millisecond) proportional to the sum of the current time and the maximum latency. In further examples, the source server can be configured to determine the delivery time with other suitable factors, weights, and/or in other suitable manners. In any of the foregoing examples, the delivery time can be calculated as a current time plus an offset that is defined by a system administrator or other suitable entities.

In certain embodiments, a delivery controller can also be configured to adjust the calculation of the delivery time based on feedbacks from the destination servers. The delay controller can be implemented as a component of the source server, as a computing service to the source server or in other suitable forms. For example, when a report from a destination server is received indicating that the packets previously transmitted arrived "late," i.e., arrived after the set delivery time has expired, the delay controller can be configured to increase the maximum latency and/or the optional safety factor in the formula above by a preset amount (e.g., 0.05 millisecond). The delay controller can be configured to keep monitoring for any additional report of late arrival of additional packets. In response to detecting additional reports of late arrival of packets, the delay controller can be configured to continue increasing the maximum latency and/or the safety factor in a step or escalating fashion until no more "late" arrival report is received.

In another example, when the delay controller receives a notification indicating a long delay between arrival and forwarding of the packets at one or more of the destination servers, the delay controller can be configured to decrease the maximum latency and/or safety factor by a preset amount (e.g., 0.05 millisecond). The delay controller can then be configured to monitor for any report of late arrival of packets. When no such report is received for a period of time (e.g., ten seconds), the delay controller can be configured to further decrease the maximum latency and/or safety factor until at least one such late arrival report is received. In response to receiving the late arrival report, the delay controller can be configured to restore the previously used maximum latency and/or safety factor that did not result in receiving any late arrival reports.

By setting the delivery time as described above, the delay controller can be configured to deliver packets containing the same information to multiple destinations at the same time or within a tolerance of time. Though packets may arrive at different destination servers at different times, the destination servers can temporarily store the packets in a buffer until the delivery time indicated in the delivery time field of the packets expires. As such, final destinations, such as virtual machines or containers hosted on the various destination servers can receive the same information from the source server at the same time or within a tolerance of time. Thus, strict physical/network communication distance control between the source server and the multiple destination servers may be avoided while providing simultaneous dissemination of the same information.

DETAILED DESCRIPTION

Figure 1:
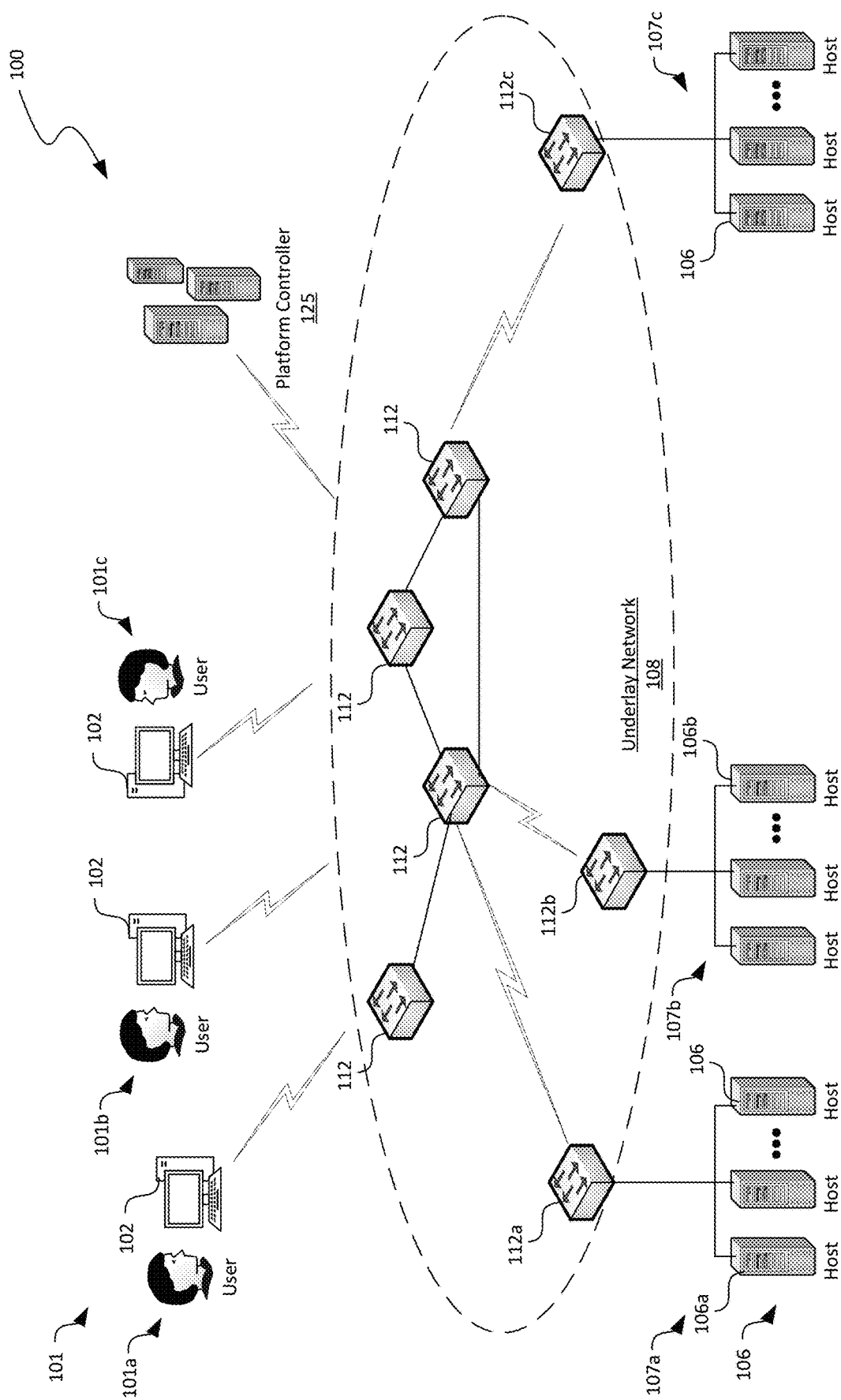
FIG. 1 is a schematic diagram illustrating a distributed computing system implementing time-sensitive data delivery in accordance with embodiments of the disclosed technology.

Certain embodiments of systems, devices, components, modules, routines, data structures, and processes for time-sensitive data delivery in datacenters or other suitable distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6.

As used herein, the term "distributed computing system" generally refers to an interconnected computer system having multiple network nodes that interconnect a plurality of servers or hosts to one another and/or to external networks (e.g., the Internet). The term "network node" generally refers to a physical network device. Example network nodes include routers, switches, hubs, bridges, load balancers, security gateways, or firewalls. A "host" generally refers to a physical computing device. In certain embodiments, a host can be configured to implement, for instance, one or more virtual machines, virtual switches, or other suitable virtualized components. For example, a host can include a server having a hypervisor configured to support one or more virtual machines, virtual switches, or other suitable types of virtual components. In other embodiments, a host can be configured to execute suitable applications directly on top of an operating system.

A computer network can be conceptually divided into an overlay network implemented over an underlay network in certain implementations. An "overlay network" generally refers to an abstracted network implemented over and operating on top of an underlay network. The underlay network can include multiple physical network nodes interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines. The virtual networks can interconnect multiple TEPs on different hosts. Virtual network nodes in the overlay network can be connected to one another by virtual links individually corresponding to one or more network routes along one or more physical network nodes in the underlay network. In other implementations, a computer network can only include the underlay network.

As used herein, a "packet" generally refers to a formatted unit of data carried by a packet-switched network. A packet typically can include user data along with control data. The control data can provide information for delivering the user data. For example, the control data can include source and destination network addresses/ports, error checking codes, sequencing information, hop counts, priority information, security information, or other suitable information regarding the user data. In accordance with embodiments of the disclosed technology, the control data can also include a delivery time field configured to contain data of a delivery time at which a packet or a payload of the packet containing time-sensitive data is allowed to be forwarded to or accessed by a final destination or endpoint, as described in more detail herein. "Time-sensitive data" generally refers to data whose importance and/or value diminishes or otherwise changes in some ways as a function of time. Typically, the control data can be contained in headers and/or trailers of a packet. The headers and trailers can include one or more data field containing suitable information. An example data schema for control data is described in more detail below with reference to FIGS. 4A and 4B.

FIG. 1 is a schematic diagram illustrating a distributed computing system 100 implementing network traffic routing and associated transmission rate limiting in accordance with embodiments of the disclosed technology. As shown in FIG. 1, the distributed computing system 100 can include an underlay network 108 interconnecting a plurality of hosts 106, a plurality of client devices 102 associated with corresponding users 101, and a platform controller 125 operatively coupled to one another. Even though particular components of the distributed computing system 100 are shown in FIG. 1, in other embodiments, the distributed computing system 100 can also include additional and/or different components or arrangements. For example, in certain embodiments, the distributed computing system 100 can also include network storage devices, additional hosts, and/or other suitable components (not shown) in other suitable configurations.

As shown in FIG. 1, the underlay network 108 can include one or more network nodes 112 that interconnect the multiple hosts 106 and the client device 102 of the users 101. In certain embodiments, the hosts 106 can be organized into racks, action zones, groups, sets, or other suitable divisions. For example, in the illustrated embodiment, the hosts 106 are grouped into three host sets identified individually as first, second, and third host sets 107a-107c. Each of the host sets 107a-107c is operatively coupled to a corresponding network nodes 112a-112c, respectively, which are commonly referred to as "top-of-rack" network nodes or "TORs." The TORs 112a-112c can then be operatively coupled to additional network nodes 112 to form a computer network in a hierarchical, flat, mesh, or other suitable types of topology. The underlay network can allow communications among hosts 106, the platform controller 125, and the users 101. In other embodiments, the multiple host sets 107a-107c may share a single network node 112 or can have other suitable arrangements.

The hosts 106 can individually be configured to provide computing, storage, and/or other suitable cloud or other suitable types of computing services to the users 101. For example, as described in more detail below with reference to FIG. 2, one of the hosts 106 can initiate and maintain one or more virtual machines 144 (shown in FIG. 2) or containers (not shown) upon requests from the users 101. The users 101 can then utilize the provided virtual machines 144 or containers to perform database, computation, communications, and/or other suitable tasks. In certain embodiments, one of the hosts 106 can provide virtual machines 144 for multiple users 101. For example, the host 106a can host three virtual machines 144 individually corresponding to each of the users 101a-101c. In other embodiments, multiple hosts 106 can host virtual machines 144 for the users 101a-101c.

The client devices 102 can each include a computing device that facilitates the users 101 to access computing services provided by the hosts 106 via the underlay network 108. In the illustrated embodiment, the client devices 102 individually include a desktop computer. In other embodiments, the client devices 102 can also include laptop computers, tablet computers, smartphones, or other suitable computing devices. Though three users 101 are shown in FIG. 1 for illustration purposes, in other embodiments, the distributed computing system 100 can facilitate any suitable numbers of users 101 to access cloud or other suitable types of computing services provided by the hosts 106 in the distributed computing system 100.

The platform controller 125 can be configured to manage operations of various components of the distributed computing system 100. For example, the platform controller 125 can be configured to allocate virtual machines 144 (or container and other suitable resources) in the distributed computing system 100, monitor operations of the allocated virtual machines 144, or terminate any allocated virtual machines 144 once operations are complete. In another example, the platform controller 125 can be configured to maintain and provide access to a platform system time. In a further example, the platform controller 125 can facilitate synchronization of local system time on the individual hosts 106 according to the Network Time Protocol or other suitable protocols. In the illustrated implementation, the platform controller 125 is shown as an independent hardware/software component of the distributed computing system 100. In other embodiments, the platform controller 125 can also be a datacenter controller, a fabric controller, or other suitable types of controller or a component thereof implemented as a computing service on one or more of the hosts 106.

Figure 2:
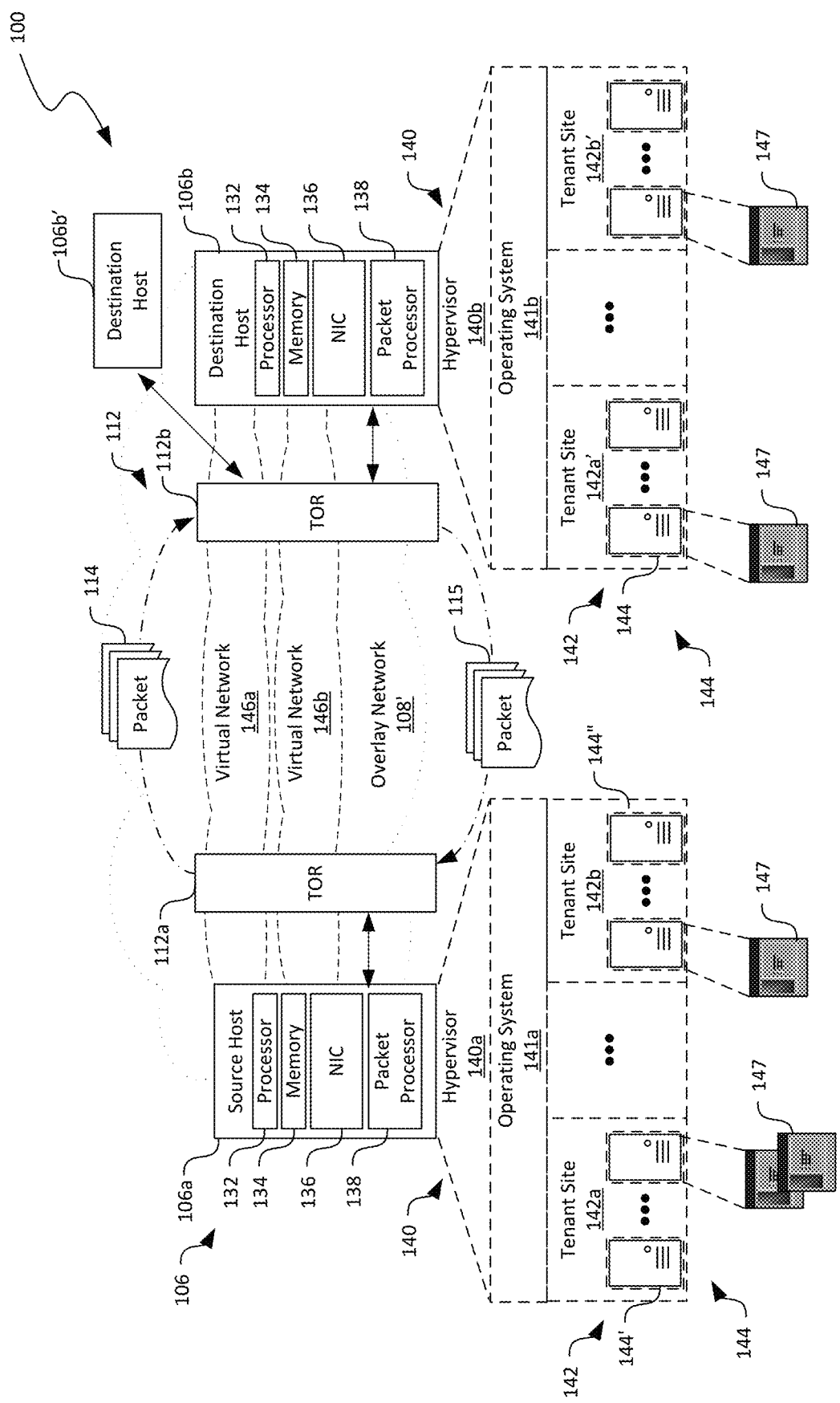
FIG. 2 is a schematic diagram illustrating certain hardware/software components of the distributed computing system of FIG. 1 in accordance with embodiments of the disclosed technology.

FIG. 2 is a schematic diagram illustrating certain hardware/software components of the distributed computing system 100 in accordance with embodiments of the disclosed technology. In particular, FIG. 2 illustrates an overlay network 108' that can be implemented on the underlay network 108 in FIG. 1. Though particular configuration of the overlay network 108' is shown in FIG. 2, In other embodiments, the overlay network 108' can also be configured in other suitable ways. In FIG. 2, only certain components of the underlay network 108 of FIG. 1 are shown for clarity.

In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the source host 106a and the destination hosts 106b and 106b' (only the destination hosts 106b is shown with detail components) can each include a processor 132, a memory 134, a network interface card 136, and a packet processor 138 operatively coupled to one another. In other embodiments, the hosts 106 can also include input/output devices configured to accept input from and provide output to an operator and/or an automated software controller (not shown), or other suitable types of hardware components.

The processor 132 can include a microprocessor, caches, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 5A-5D). Though only one processor 132 and one memory 134 are shown in the individual hosts 106 for illustration in FIG. 2, in other embodiments, the individual hosts 106 can include two, six, eight, or any other suitable number of processors 132 and/or memories 134.

The source host 106a and the destination host 106b can individually contain instructions in the memory 134 executable by the processors 132 to cause the individual processors 132 to provide a hypervisor 140 (identified individually as first and second hypervisors 140a and 140b) and an operating system 141 (identified individually as first and second operating systems 141a and 141b). Even though the hypervisor 140 and the operating system 141 are shown as separate components, in other embodiments, the hypervisor 140 can operate on top of the operating system 141 executing on the hosts 106 or a firmware component of the hosts 106.

The hypervisors 140 can individually be configured to generate, monitor, terminate, and/or otherwise manage one or more virtual machines 144 organized into tenant sites 142. For example, as shown in FIG. 2, the source host 106a can provide a first hypervisor 140a that manages first and second tenant sites 142a and 142b, respectively. The destination host 106b can provide a second hypervisor 140b that manages first and second tenant sites 142a' and 142b', respectively. The hypervisors 140 are individually shown in FIG. 2 as a software component. However, in other embodiments, the hypervisors 140 can be firmware and/or hardware components. The tenant sites 142 can each include multiple virtual machines 144 for a particular tenant (not shown). For example, the source host 106a and the destination host 106b can both host the tenant site 142a and 142a' for a first tenant 101a (FIG. 1). The source host 106a and the destination host 106b can both host the tenant site 142b and 142b' for a second tenant 101b (FIG. 1). Each virtual machine 144 can be executing a corresponding operating system, middleware, and/or applications.

Also shown in FIG. 2, the distributed computing system 100 can include an overlay network 108' having one or more virtual networks 146 that interconnect the tenant sites 142a and 142b across multiple hosts 106. For example, a first virtual network 142a interconnects the first tenant sites 142a and 142a' at the source host 106a and the destination host 106b. A second virtual network 146b interconnects the second tenant sites 142b and 142b' at the source host 106a and the destination host 106b. Even though a single virtual network 146 is shown as corresponding to one tenant site 142, in other embodiments, multiple virtual networks 146 (not shown) may be configured to correspond to a single tenant site 146.

The virtual machines 144 can be configured to execute one or more applications 147 to provide suitable cloud or other suitable types of computing services to the users 101 (FIG. 1). For example, the source host 106a can execute an application 147 that is configured to provide a computing service that monitors online trading and distribute price data to multiple users 101 subscribing to the computing service. The virtual machines 144 on the virtual networks 146 can also communicate with one another via the underlay network 108 (FIG. 1) even though the virtual machines 144 are located on different hosts 106.

Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machines 144 in a particular virtual network 146. Thus, different virtual networks 146 can use one or more virtual network addresses that are the same. Example virtual network addresses can include IP addresses, MAC addresses, and/or other suitable addresses. To facilitate communications among the virtual machines 144, virtual switches (not shown) can be configured to switch or filter packets 114 directed to different virtual machines 144 via the network interface card 136 and facilitated by the packet processor 138.

As shown in FIG. 2, to facilitate communications with one another or with external devices, the individual hosts 106 can also include a network interface card ("NIC") 136 for interfacing with a computer network (e.g., the underlay network 108 of FIG. 1). A NIC 136 can include a network adapter, a LAN adapter, a physical network interface, or other suitable hardware circuitry and/or firmware to enable communications between hosts 106 by transmitting/receiving data (e.g., as packets) via a network medium (e.g., fiber optic) according to Ethernet, Fibre Channel, Wi-Fi, or other suitable physical and/or data link layer standards. During operation, the NIC 136 can facilitate communications to/from suitable software components executing on the hosts 106. Example software components can include the virtual switches 141, the virtual machines 144, applications 147 executing on the virtual machines 144, the hypervisors 140, or other suitable types of components.

In certain implementations, a packet processor 138 can be interconnected to and/or integrated with the NIC 136 in order to facilitate network traffic operations for enforcing communications security, performing network virtualization, translating network addresses, maintaining/limiting a communication flow state, or performing other suitable functions. In certain implementations, the packet processor 138 can include a Field-Programmable Gate Array ("FPGA") integrated with the NIC 136.

An FPGA can include an array of logic circuits and a hierarchy of reconfigurable interconnects that allow the logic circuits to be "wired together" like logic gates by a user after manufacturing. As such, a user 101 can configure logic blocks in FPGAs to perform complex combinational functions, or merely simple logic operations to synthetize equivalent functionality executable in hardware at much faster speeds than in software. In the illustrated embodiment, the packet processor 138 has one interface communicatively coupled to the NIC 136 and another coupled to a network switch (e.g., a Top-of-Rack or "TOR" switch) at the other. In other embodiments, the packet processor 138 can also include an Application Specific Integrated Circuit ("ASIC"), a microprocessor, or other suitable hardware circuitry. In any of the foregoing embodiments, the packet processor 138 can be programmed by the processor 132 (or suitable software components associated therewith) to route packets inside the packet processor 138 in order to achieve various aspects of time-sensitive data delivery, as described in more detail below with reference to FIGS. 3A-5.

In operation, the processor 132 and/or a user 101 (FIG. 1) can configure logic circuits in the packet processor 138 to perform complex combinational functions or simple logic operations to synthetize equivalent functionality executable in hardware at much faster speeds than in software. For example, the packet processor 138 can be configured to process inbound/outbound packets for individual flows according to configured policies or rules contained in a flow table such as a MAT. The flow table can contain data representing processing actions corresponding to each flow for enabling private virtual networks with customer supplied address spaces, scalable load balancers, security groups and Access Control Lists ("ACLs"), virtual routing tables, bandwidth metering, Quality of Service ("QoS"), etc.

As such, once the packet processor 138 identifies an inbound/outbound packet as belonging to a particular flow, the packet processor 138 can apply one or more corresponding policies in the flow table before forwarding the processed packet to the NIC 136 or TOR 112. For example, as shown in FIG. 2, the application 147, the virtual machine 144, and/or other suitable software components on the source host 106a can generate an outbound packet 114 destined to, for instance, other applications 147 at the destination hosts 106b and 106b'. The NIC 136 at the source host 106a can forward the generated packet 114 to the packet processor 138 for processing according to certain policies in a flow table. Once processed, the packet processor 138 can forward the outbound packet 114 to the first TOR 112a, which in turn forwards the packet to the second TOR 112b via the overlay/underlay network 108 and 108'.

The second TOR 112b can then forward the packet 114 to the packet processor 138 at the destination hosts 106b and 106b' to be processed according to other policies in another flow table at the destination hosts 106b and 106b'. If the packet processor 138 cannot identify a packet as belonging to any flow, the packet processor 138 can forward the packet to the processor 132 via the NIC 136 for exception processing. In another example, when the first TOR 112a receives an inbound packet 115, for instance, from the destination host 106b via the second TOR 112b, the first TOR 112a can forward the packet 115 to the packet processor 138 to be processed according to a policy associated with a flow of the packet 115. The packet processor 138 can then forward the processed packet 115 to the NIC 136 to be forwarded to, for instance, the application 147 or the virtual machine 144.

In the distributed computing system 100, different hosts 106 can be dynamically provisioned to execute applications 147 based on workload, execution priority, resource availability, or other suitable criteria. As such, maintaining a constant physical and/or network communication distance between the different hosts 106 may be impractical. For example, an application 147 executing on the source host 106a may have a communication distance with another application 147 executing on the destination host 106b that is different than one executing on the other destination host 106b' or other hosts 106 in the distributed computing system 100. Consequently, the users 101 subscribing to the related computing services provided by the application 147 executing on the source host 106a may experience communication latency variations. Thus, some users 101 may receive certain information, for instance, price data from the source host 106a before others, thereby unfairly disadvantage the other users 101.

Several embodiments of the disclosed technology can address certain aspects of the foregoing difficulties by implementing a source-configured delivery time mandate for packets 114 containing the same time-sensitive data delivered from a source (e.g., the source host 106a) to multiple destinations or endpoints (e.g., the destination host 106b and other hosts 106 in the distributed computing system 100. In one implementation, packets 114 can be configured to include a delivery time field in a preamble of the packets 114. The delivery time field can be configured to contain data representing a delivery time at which the packets 114 or payloads of the packets 114 are allowed to be forwarded from a host 106 to a final destination, such as a virtual machine, container, or other suitable types of endpoint hosted on the host 106. As such, early access to the time-sensitive data by some users 101 may be prevented, as described in more detail below with reference to FIGS. 3A-5.

Figure 3A:
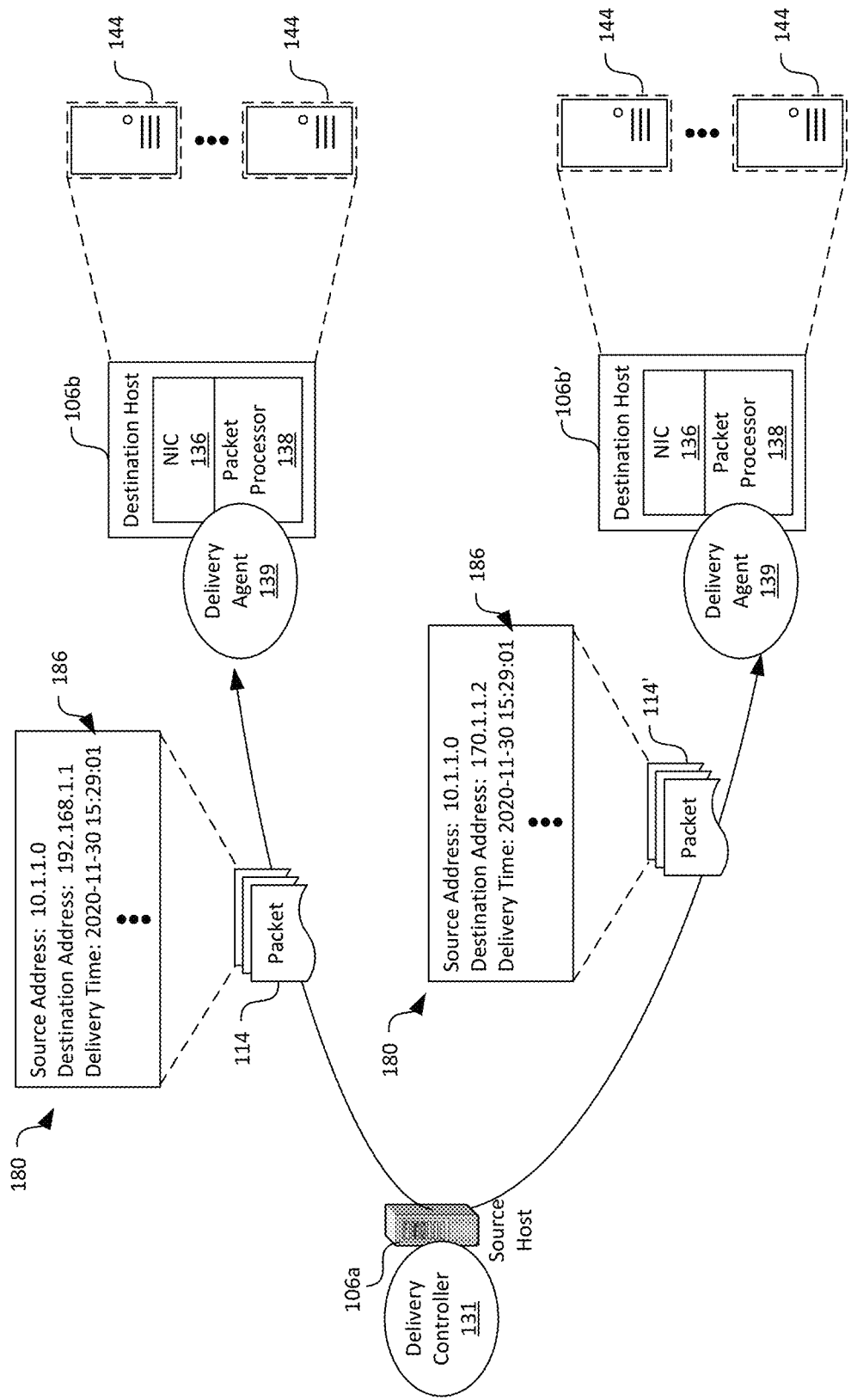
FIGS. 3A-3D are schematic diagrams illustrating certain example operations of time-sensitive data delivery in a distributed computing system in accordance with embodiments of the disclosed technology.

FIG. 3A-3D are schematic diagrams illustrating certain example operations of time-sensitive data delivery in a distributed computing system in accordance with embodiments of the disclosed technology. As shown in FIG. 3A, the destination hosts 106b and 106b' can each include a delivery agent 139 that is configured to enforce a source-configured delivery time mandate for packets 114 containing the same or similar time-sensitive data from the source host 106a. The delivery agent 139 can be implemented in the packet processor 138, the NIC 136, the hypervisor 140 (shown in FIG. 2), the operating system 141 (shown in FIG. 2), in the TOR 112a-112c (shown in FIG. 1), or in other suitable manners. In the illustrated example, packets 114 can be configured to include a delivery time field 186 in, for instance, a preamble of the packets 114. In other embodiments, the delivery time field can be included in a midamble, suffix, or other portions of the packets 114.

The delivery time field 186 can be configured to contain data representing a delivery time at which the packets 114 or payloads of the packets 114 are allowed to be forwarded from the destination hosts 106b and 106b' to a final destination or endpoint, such as a virtual machine 144 hosted on the destination hosts 106b and 106b', as identified in, for example, a destination IP address field, a media access control ("MAC") address, or other suitable network address filed of the packets 114. For instance, as shown in FIG. 3A, the packet 114 destined to the destination host 106b can include header field that contain data representing a source address (e.g., "10.1.1.0"), a destination address of a virtual machine 144 (e.g., "192.168.1.1"), and a delivery time (e.g., "2020-11-30 15:29:01"). On the other hand, the packet 114' destined to the destination host 106b' can include header field that contain data representing the same source address (e.g., "10.1.1.0"), a different destination address of another virtual machine 144 (e.g., "170.1.1.2"), and the same delivery time (e.g., "2020-11-30 15:29:01").

Upon receiving the packets 114 and 114', the delivery agents 139 at the destination hosts 106b and 106b' can individually inspect the data included in the delivery time field 186 of the packets 114 and 114' to identify the delivery time set by the source host 106a, e.g., "2020-11-30 15:29:01." Though the delivery times for both the destination hosts 106b and 106b' are shown as being the same in FIG. 3A, in other embodiments, the delivery times can be different to accommodate clock drift or for other suitable reasons. The delivery agent 139 can also be configured to determine whether the identified delivery time indicated by the data in the delivery time field 186 has expired when compared to, for instance, a local system time, a platform system time, or other suitable standard time. When the local system time is used, the destination hosts 106b and 106b' can be configured to synchronize the local system time according to the Network Time Protocol Precision Time Protocol, or other suitable protocols. The time synchronization can be based on a remote reference clock (e.g., a clock at a Global Positioning System receiver) or other suitable types of reference clocks.

Figure 3B:
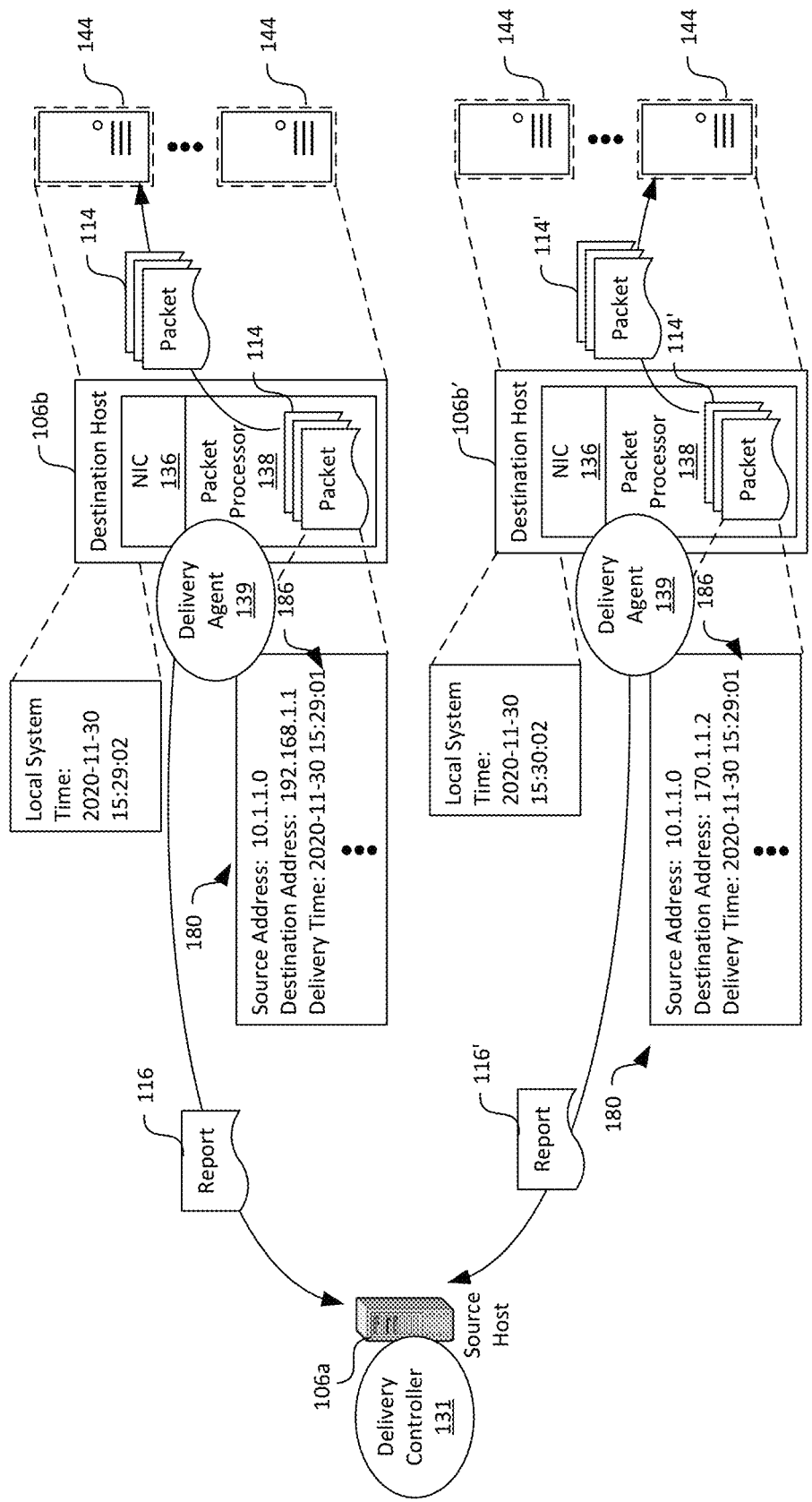

In response to determining that the delivery time has expired, the delivery agents 139 at the destination hosts 106b and 106b' can be configured to forward or otherwise allow access to the packets 114 and 114' or payloads of the packets 114 and 114' by the final destinations immediately, such as the virtual machines 144, as shown in FIG. 3B. In the illustrated example, the delivery time is "2020-11-30 15:29:01" while the local system time at the destination hosts 106a and 106' are "2020-11-30 15:29:01" and "2020-11-30 15:30:02," respectively. As such, the delivery time included in the packets 114 and 114' has expired when the packets 114 and 114' arrive at the destination hosts 106b and 106b'. As such, the delivery agents 139 can cause the packets 114 and 114' to immediately allow access to the packets 114 and 114' by the virtual machines 144 identified, for instance, by the network addresses "192.168.1.1" and "170.1.1.2." The destination hosts 106b and 106b' can also be configured to optionally transmit a report 116 and 116' to the source host 106a, the final destination (e.g., the virtual machines 144), a monitoring environment (e.g., the platform controller 125 in FIG. 1), or other suitable entities indicating that the packets 114 and 114' have arrived "late," i.e., after the delivery time has expired and request the source host 106a to adjust the delivery time for future packets (not shown).

Figure 3C:
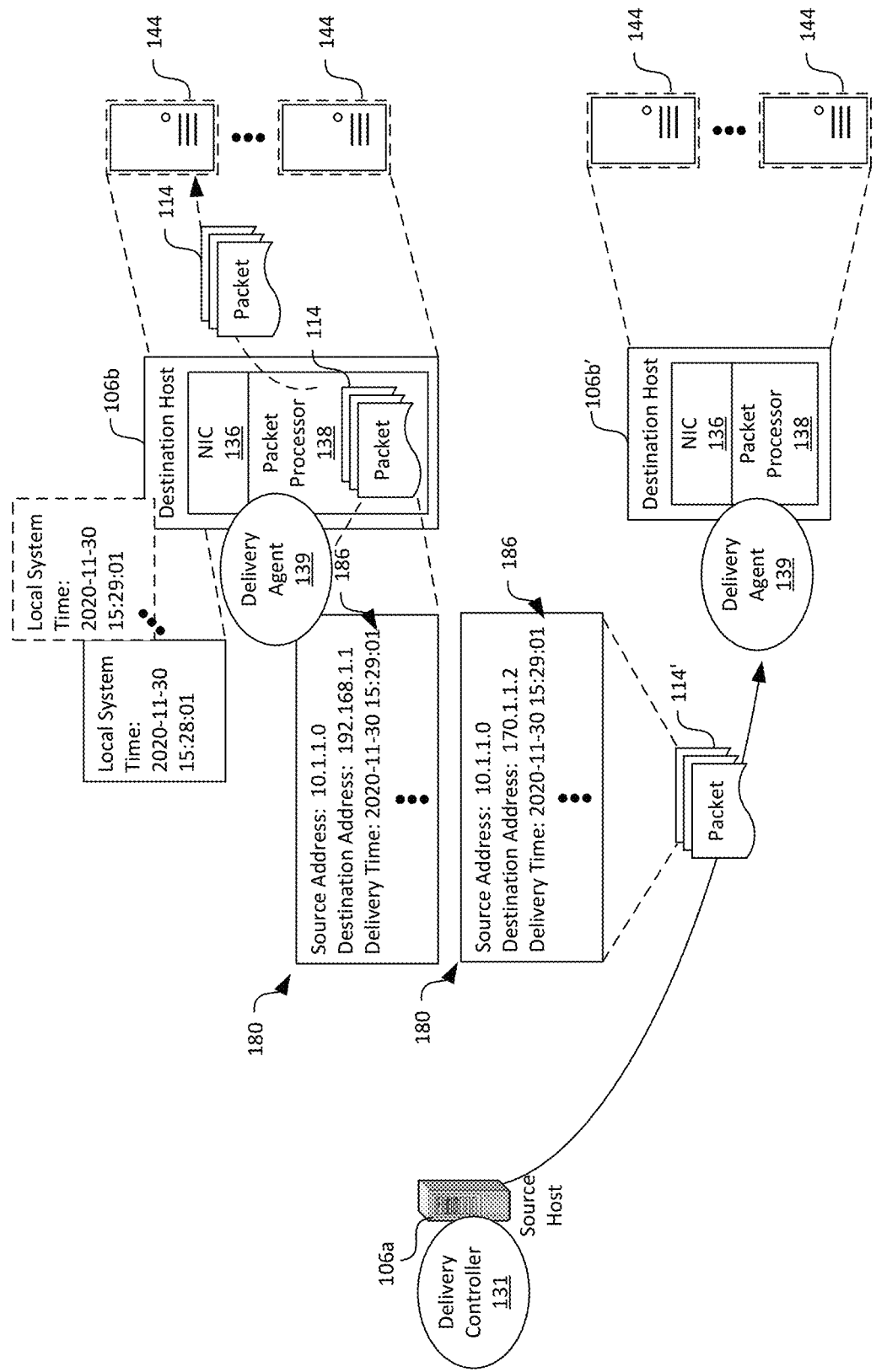

On the other hand, in response to determining that the delivery time has not expired, the delivery agents 139 at the destination hosts 106b and 106b' can be configured to temporarily store the packets 114 and 114' or the payloads of the packets 114 and 114' in a buffer until the delivery time indicated in the delivery time field 186 expires. The buffer can include a physical and/or virtual storage in the NIC 136, the packet processor 138, coupled to the NIC 136, the hypervisor 140 (shown in FIG. 2), the operating system 141 (shown in FIG. 2) on the destination hosts 106b and 106b' or a combination thereof. For example, as shown in FIG. 3C, the packet 114 has arrived at the destination host 106b while the packet 114' is still in transit from the source host 106a to the destination host 106b'. Upon receiving the packet 114, the delivery agent 139 at the destination host 106b can determine that the delivery time (e.g., "2020-11-30 15:29:01") has not expired yet when compared to a local system time (e.g., "2020-11-30 15:28:01"). As such, the delivery agent 139 can be configured to temporarily store the packet 114 in the packet processor 138 without forwarding the packet 114 to the virtual machine 144 executing on the destination host 106b and identified by the destination address, e.g., "192.168.1.1." As such, even though the packet 114 arrives at the destination host 106b before the packet 114' containing the same time-sensitive information arrives at the destination host 106b', the packet 114 and the time-sensitive information contained in the packet 114 is held until the delivery time expires, as shown with dashed lines in FIG. 3C. Though the temporary storage operation is described above in the context of the destination hosts 106b and 106b', in further implementations, the foregoing delivery time determination and temporary storage operations can also be performed by, for example, a network node such as the TOR 112 in FIG. 1 before the packets are delivered to the destination hosts 106b and 106b'.

Figure 3D:
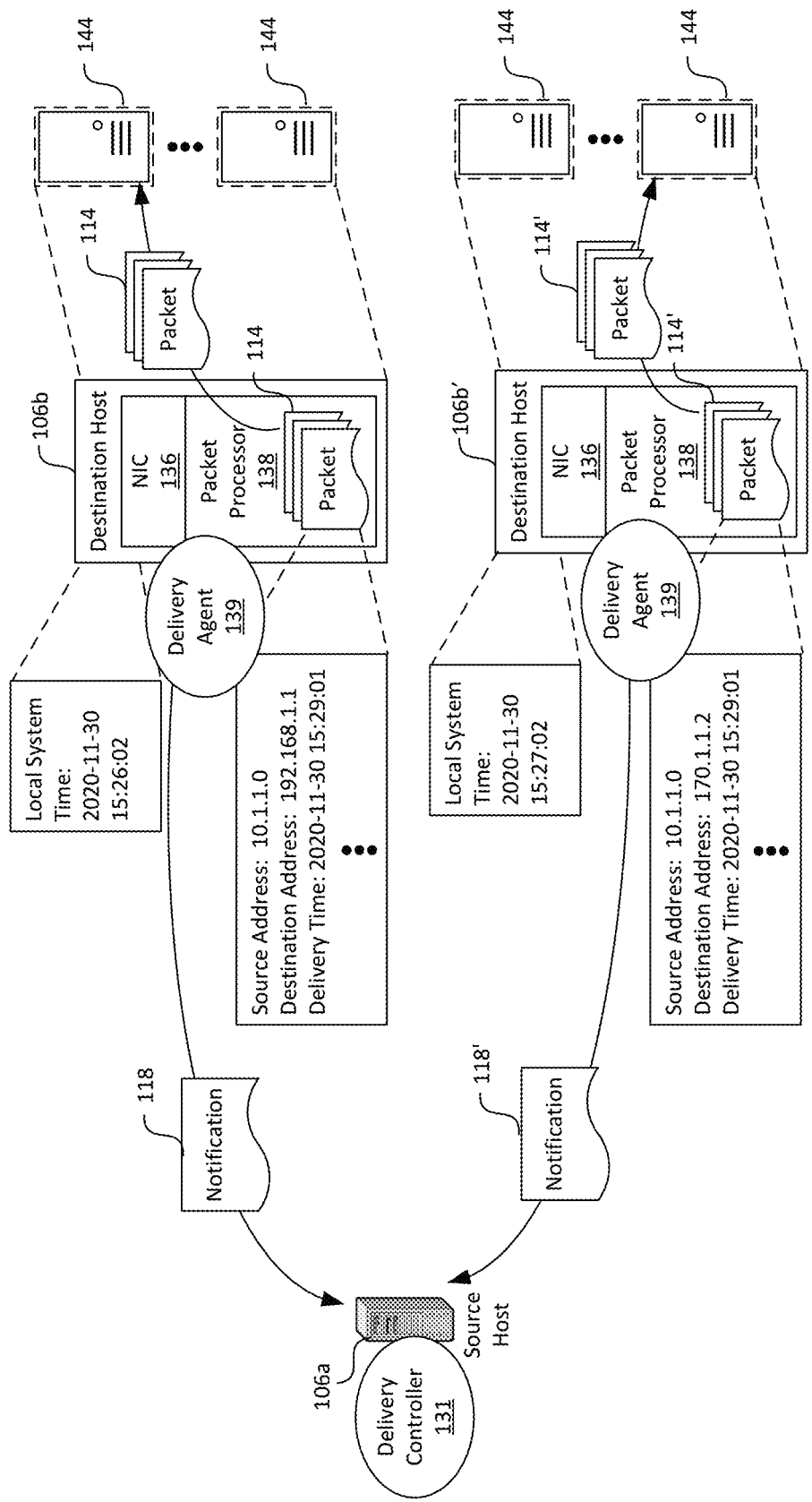

In certain embodiments, the destination hosts 106b and 106b' can also be configured to determine a difference between the delivery time indicated in the delivery time field 186 of the packets 114 and 114' and the local or platform system time at which the packets 114 and 114' were received. The destination hosts 106b and 106b' can then compare the determined difference with a delay threshold. When the difference equals or exceeds the delay threshold, the destination hosts 106b and 106b' can be configured to transmit a notification 118 and 118' to the source host 106a, the delivery controller 131, or other suitable entities indicating that a "long" delay between reception and forwarding of the packets hosts 106b and 106b' to the final destinations is detected, as shown in FIG. 3D. In other embodiments, the destination hosts 106b and 106b' can also be configured to report the determined difference to the source host 106a, the delivery controller 131, or other suitable entities in response to or irrespective of whether a long delay is detected.

The source host 106a can be configured to set the delivery time in various ways in order to achieve simultaneous or near simultaneous (e.g., within 0.1 millisecond) delivery of the packets 114 and 114' and associated payloads containing the same time-sensitive data to the final destinations. In one embodiment, the source host 106a can be configured to calculate a value of the delivery time based on a current time at the source host 106a and an estimated maximum latency of communicating with all the destination hosts 106. For instance, the source host 106a can periodically transmit test packets (e.g., pings, not shown) to the various destination hosts 106 and record latency values between transmitting the test packets and receiving a response in return. The source host 106a can also record values such as round-trip time when establishing network connections with the destination host 106a or determine latency values to the destination host 106a in other suitable manners.

Based on the recorded historical latency data, the source host 106a can be configured to select a maximum latency corresponding to one or more of the destination host 106a and set the delivery time to be a current time plus the maximum latency and optionally a safety factor, as follows:

Delivery time=Current time+Maximum latency+ Safety factor

The safety factor can be 0%, 10%, 20%, or other suitable proportions of the largest latency or can be a fixed or adjustable time value (e.g., 1 millisecond) proportional to the sum of the current time and the maximum latency. In further examples, the source host 106a can be configured to determine the delivery time with other suitable factors, weights, and/or in other suitable manners. In any of the foregoing examples, the delivery time can be calculated as a current time plus an offset that is defined by a system administrator or other suitable entities.

In certain embodiments, the source host 106a can also include a delivery controller 131 that is configured to adjust the calculation of the delivery time based on feedbacks from the destination hosts 106. Though the delay controller 131 is shown in FIG. 3A as being implemented as a component of the source server 106a, in other implementations, the delay controller 131 can be implemented as a computing service available to the source server 106a or in other suitable forms. In the illustrated example, when a report 116 from a destination host 106 is received indicating that the packets 114 or 114' previously transmitted arrived "late," i.e., arrived after the set delivery time has expired, the delivery controller 131 can be configured to increase the maximum latency and/or the optional safety factor in the formula above by a preset amount (e.g., 0.5 millisecond). The delivery controller 131 can be configured to keep monitoring for any additional report of late arrival of additional packets 114 and 114'. In response to detecting additional reports of late arrival of packets 114 and 114', the delivery controller 131 can be configured to continue increasing the maximum latency and/or the safety factor in a step or escalating fashion until no more "late" arrival report is received.

In another example, when the delivery controller 131 receives a notification 118 or 118' indicating a long delay between arrival and forwarding of the packets 114 and 114' at one or more of the destination hosts 106, the delivery controller 131 can be configured to decrease the maximum latency and/or safety factor by a preset amount (e.g., 0.5 millisecond). The delivery controller 131 can then be configured to monitor for any report 116 of late arrival of packets 114 and 114'. When no such report 116 is received for a period of time (e.g., ten seconds), the delivery controller 131 can be configured to further decrease the maximum latency and/or safety factor until at least one such late arrival report 116 is received. In response to receiving the late arrival report 116, the delivery controller 131 can be configured to restore the previously used maximum latency and/or safety factor that did not result in receiving any late arrival reports 116.

By setting the delivery time as described above, the delivery controller 131 can be configured to deliver packets 114 and 114' containing the time-sensitive information to multiple destinations (e.g., the virtual machines 144) at the same time or within a tolerance of time. Though packets 114 and 114' may arrive at different destination hosts 106 at different times, the destination hosts 106 can temporarily store the packets 114 and 114' in a buffer until the delivery time indicated in the delivery time field of the packets 114 and 114' expires. As such, final destinations, such as virtual machines 144, containers, or applications 147 (FIG. 2) hosted on the various destination hosts 106 can receive the same or similar information from the source host 106a at the same or within a tolerance of time. Thus, strict physical/network communication distance control between the source host 106a and the multiple destination hosts 106 may be avoided while providing simultaneous dissemination of the same information.

Though the technique is described above as being implemented via storing the packets or portions thereof in a buffer, in other embodiments, identifiers of the packets may be stored in the buffer instead of the packets. A platform key (e.g., a master key at a host 106) may then be used to derive the decryption key for decrypting the packets such as by hashing the master key with the stored identifiers of the packets. In further embodiments, the destination hosts 106 can provide a decryption facility (not shown) to decrypt the packet. The decryption facility can a trusted platform module, a decryption module in an operating system or hypervisor, a standalone application, or in other suitable forms. During operation, the final destination or endpoint, e.g., a virtual machine 144 can present the packets with the delivery time to the decryption facility. In turn, the decryption facility can be configured to decrypt and provide the virtual machine 144 access to the information in the packets only after expiration of the delivery time.

Figure 4A:
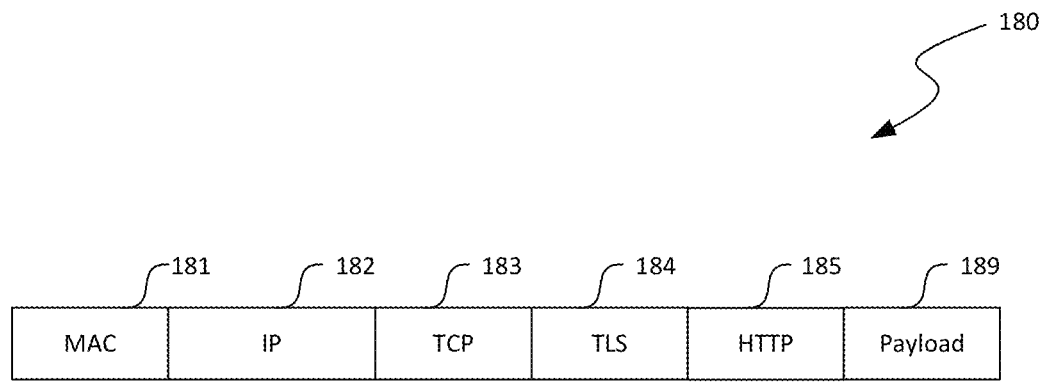
FIGS. 4A and 4B illustrate an example data schema for a packet header suitable for implementing time-sensitive data delivery in accordance with embodiments of the disclosed technology.

FIG. 4A is a schematic diagram illustrating a data schema 180 suitable for a packet header in accordance with embodiments of the disclosed technology. As shown in FIG. 4A, the data schema 180 can include a MAC field 181, an IP field 182, a TCP field 183, a TLS field 184, an HTTP field 185, and a payload 189. The MAC field 181, the IP field 182, and the TCP field 183 can be configured to contain a MAC address, an IP address, and a port number of the NIC 136 (FIG. 2) and/or the host 106 (FIG. 2), respectively. In certain embodiments, the IP field 182 can also include a delivery time field 186 (shown in FIG. 4B) configured to contain a delivery time. In other embodiments, the delivery time field 186 can also be an encapsulating layer header in the data schema. The TLS field 184 can be configured to contain a value indicating a type of data contained in the packet. Example values for the TLS field 184 can include APPLICATION_DATA, CHANGE_CIPHER_SPEC, ALERT, or HANDSHAKE.

The HTTP field 185 can be configured to contain various parameters according to the HTTP protocol. For example, the parameters can include a content length of the data in the data field, cache control, etc. Example header fields of the IP field 182 are described in more detail with reference to FIG. 4B. Even though the example data schema 180 includes the HTTP field 185, in other embodiments, the data schema 180 can include Secure Shell, Secure Copy, Secure FTP, or other suitable header fields.

Figure 4B:
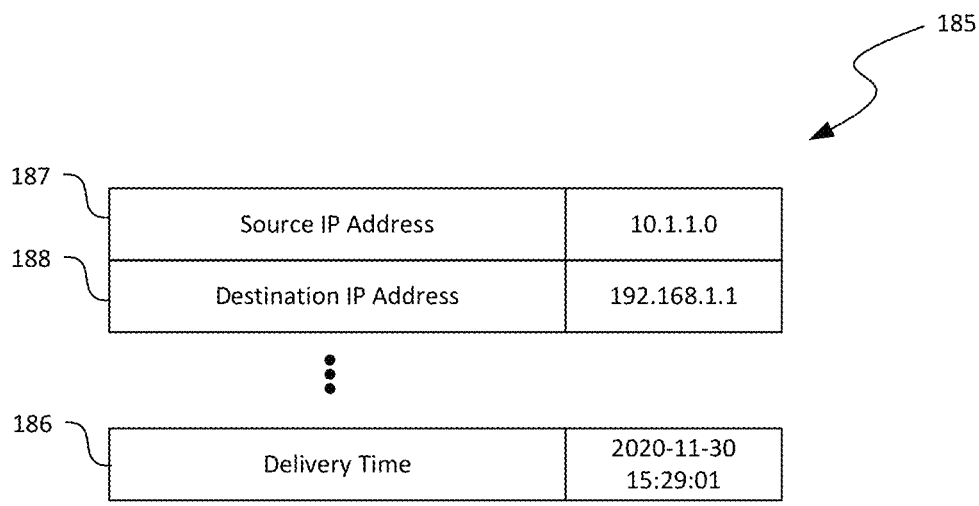

FIG. 4B is a schematic diagram illustrating example header fields suitable for the IP field 182 in FIG. 4A in accordance with embodiments of the disclosed technology. As shown in FIG. 4B, the header fields can include a source IP address field 187, a destination IP address field 188, and a delivery time field 186 containing example IP addresses and a delivery time, respectively. Though particular fields are shown in FIG. 4B as examples, in other embodiments, the IP header 182 can also include additional and/or different fields configured to contain other suitable parameters in addition to those shown in FIG. 4B.

FIGS. 5A-5D are flowcharts illustrating processes for implementing time-sensitive data delivery in accordance with embodiments of the disclosed technology. Though the processes are described below in light of the distributed computing system 100 of FIGS. 1-3D, in other embodiments, the processes can also be performed in other computing systems with similar or different components.

Figure 5A:
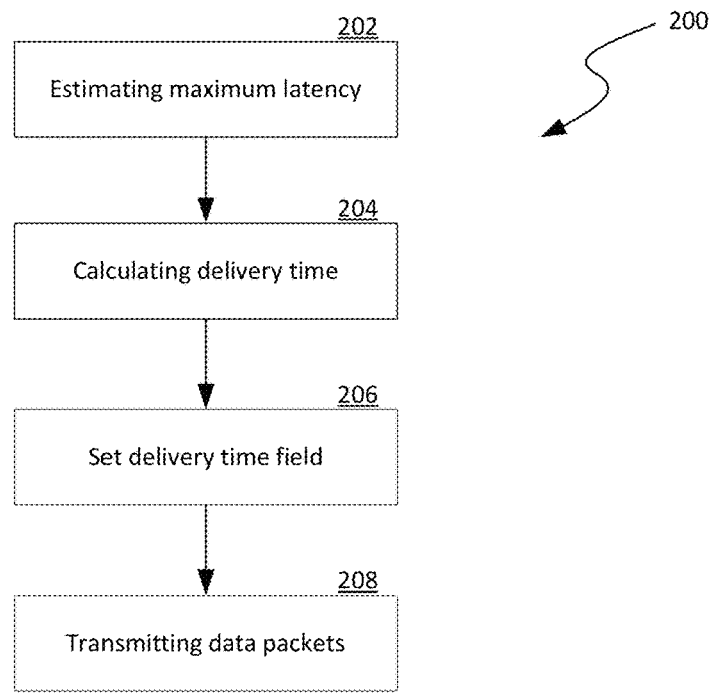
FIGS. 5A-5D are flowcharts illustrating various processes for time-sensitive data delivery in a distributed computing system in accordance with embodiments of the disclosed technology.

As shown in FIG. 5A, a process 200 can include estimating a maximum latency between a source host and multiple destination hosts at stage 202. As described above, the maximum latency can be estimated based on historical latency data obtained via, for instance, transmitting test packets and monitoring for responses. The process 200 can then include calculating a delivery time at stage 204. The delivery time can be calculated based on a current time of the source host and the estimated maximum latency as described above with reference to FIGS. 3A-3D. The process 200 can also include setting the calculated value of the delivery time as a parameter in a delivery time field of packets to be transmitted to the multiple destination hosts at stage 206. The process 200 can further include transmitting the packets with the set delivery time at stage 208.

Figure 5B:
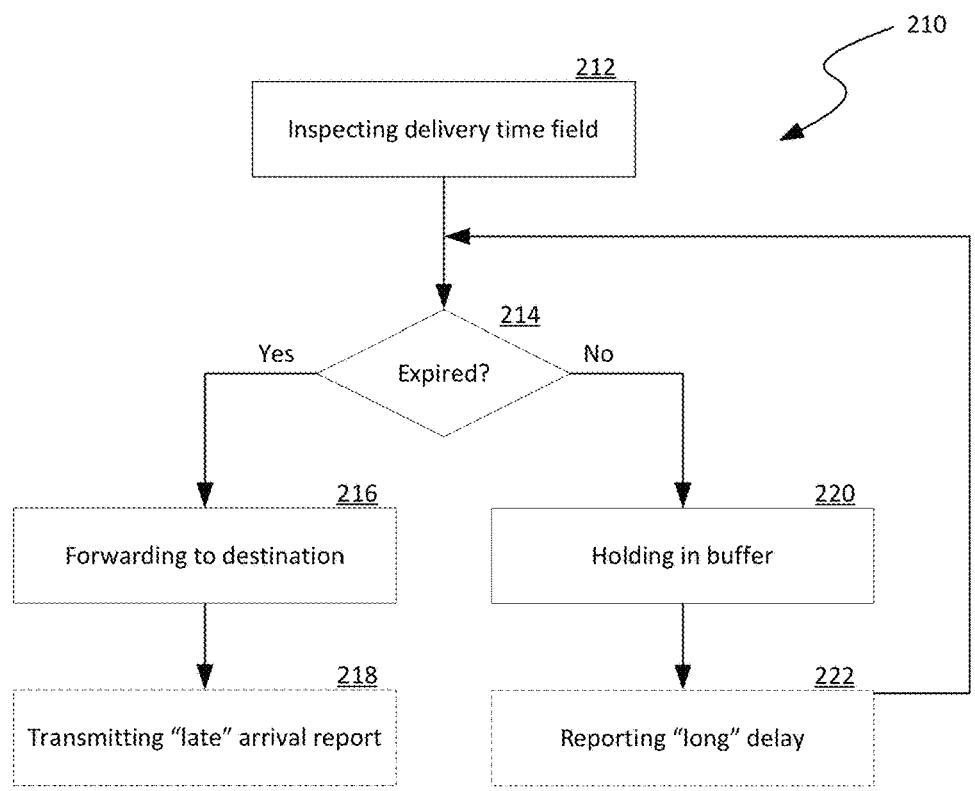

As shown in FIG. 5B, another process 210 can include inspecting data in the delivery time field upon receiving a packet from the source host at stage 212. The process 210 can then include a decision stage 214 to determine whether the delivery time included in the delivery time field has expired. In response to determining that the delivery time has expired, the process 210 proceeds to forwarding the packet to the final destination immediately at stage 216 and optionally transmitting a "late" arrival report to the source host, the delivery controller, or other suitable entities at stage 218. In response to determining that the delivery time has not expired, the process 210 proceeds to holding the packet in a buffer at the destination host without forwarding the packet to the final destination at stage 220. The process 210 can optionally include determining whether the difference between the time of arrival and the delivery time exceeds a delay threshold and reporting a "long" delay to the source host, the delivery controller, or other suitable entities in response to determining that the difference exceeds the delay threshold at stage 222.

Figure 5C:
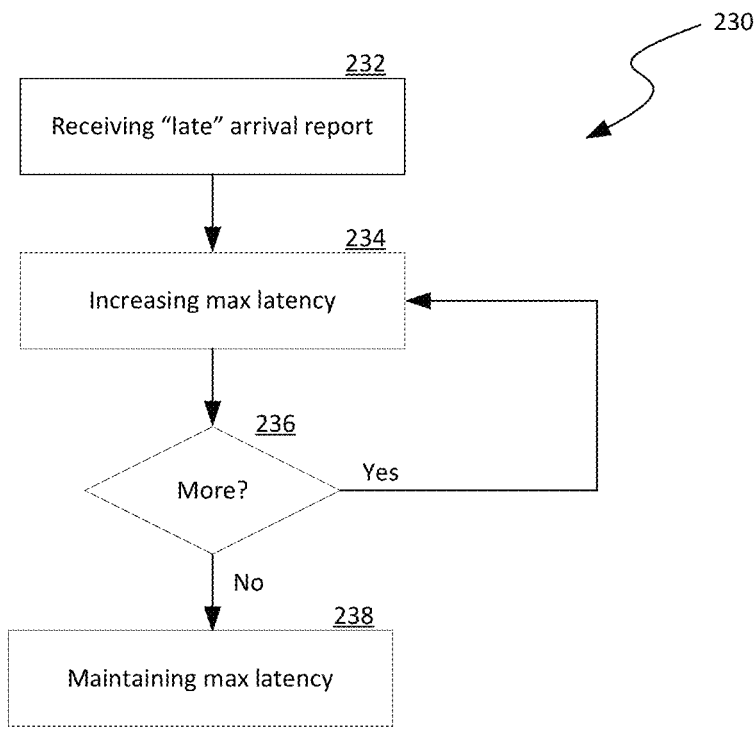

As shown in FIG. 5C, a process 230 can include receiving, at a source host, a "late" arrival report at stage 232. As described above, the late arrival report indicates that the delivery time has expired before the packet is received at a destination host. The process 230 can also include increasing the maximum latency used to calculate the delivery time at stage 234. Various ways of increasing the maximum latency are described above with reference to FIGS. 3A-3D. The process 230 can then include a decision stage 236 to determine whether additional late arrival reports are received. In response to determining that an additional late arrival report is received, the process 230 revers to increasing the maximum latency at stage 234. Otherwise, the process 230 proceeds to maintaining the maximum latency at stage 238.

Figure 5D:
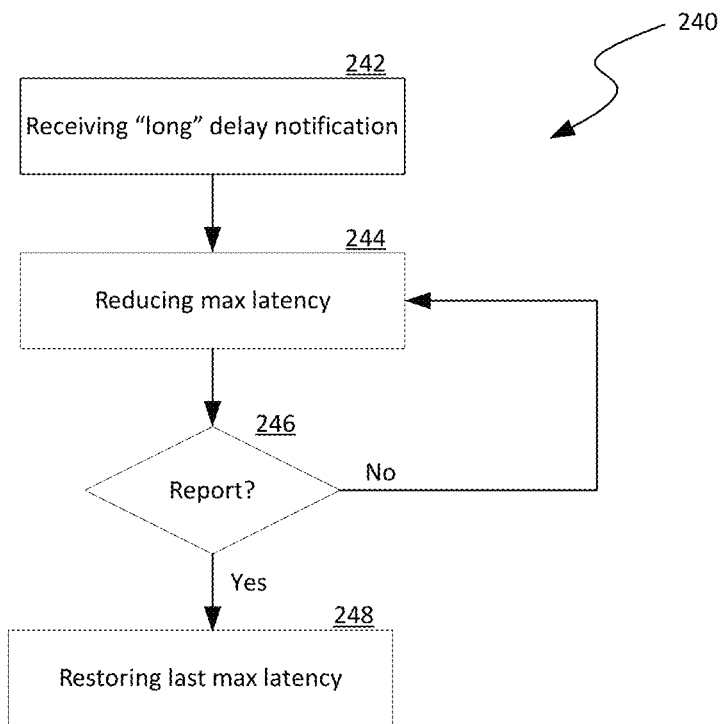

As shown in FIG. 5D, a process 240 can include receiving a "long" delay notification from a destination host at stage 242. The process 240 can also include reducing the maximum latency at stage 244. Various ways of decreasing the maximum latency are described above with reference to FIGS. 3A-3D. The process 240 can then include a decision stage 246 to determine whether any late arrival report is received. In response to determining that no late arrival report is received, the process 240 reverts to reducing the maximum latency at stage 244. Otherwise, the process 240 proceeds to restoring the maximum latency last used that did not cause reception of any late arrival reports at stage 248.

Figure 6:
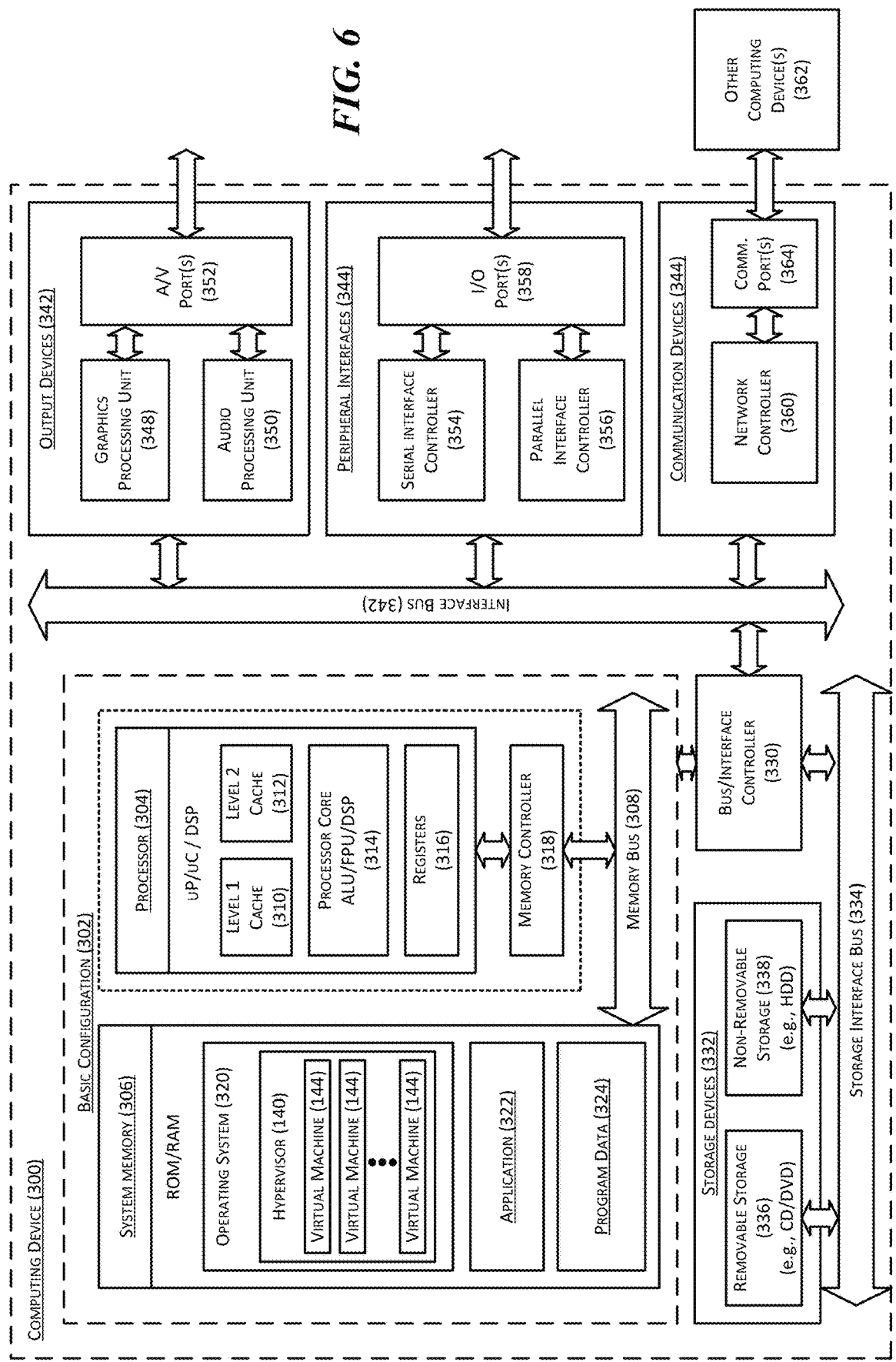
FIG. 6 is a computing device suitable for certain components of the distributed computing system in FIG. 1.

FIG. 6 is a computing device 300 suitable for certain components of the distributed computing system 100 in FIG. 1. For example, the computing device 300 can be suitable for the hosts 106, the client devices 102, or the platform controller 125 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 11, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable, and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

I claim:

1. A method for time-sensitive data delivery in a distributed computing system having a plurality of servers interconnected by a computer network, the method comprising:
receiving, at multiple servers in the distributed computing system, packets from a source host, the packets individually having:
a header with a first header field containing data representing a delivery time and a second header field containing data representing a network address identifying a virtual machine or container hosted on the multiple servers; and
a payload containing data representing copies of information destined to the identified virtual machines or containers hosted at the multiple servers;
in response to receiving the packets, at the multiple servers hosting the identified virtual machines or containers:
inspecting the data in the header field to identify the delivery time;
performing a comparison of the identified delivery time to a system time at the multiple servers hosting the identified virtual machines or containers;

based on the performed comparison, storing the received packets in a buffer at the multiple servers hosting the identified virtual machines or containers without allowing the received packets to be accessed by the virtual machine or container identified by the network address in the second header field prior to the identified delivery time being expired, thereby preventing the virtual machine or container hosted at a first of the multiple servers hosting the identified virtual machines or containers from accessing the information in the payload of the packets earlier than another virtual machine or container hosted at a second of the multiple servers hosting the identified virtual machines or containers; and allowing the packets or the payload of the packets to be accessed by the identified virtual machines or containers after expiration of the delivery time, thereby providing time-sensitive data delivery of the copies of the same information in the payload to the identified virtual machines or containers.

2. The method of claim 1 wherein performing the comparison includes:

performing the comparison of the identified delivery time to the system time at the multiple servers hosting the identified virtual machines or containers to determine whether the delivery time has expired; and in response to determining that the delivery time has expired, immediately forwarding the packets to the virtual machine or container identified by the network address in the second header field; and transmitting data representing a report indicating that the packets have arrived after the delivery time has expired.

3. The method of claim 1 wherein performing the comparison includes:

performing the comparison of the identified delivery time to the system time at the multiple servers hosting the identified virtual machines or containers to determine whether the delivery time has expired; and in response to determining that the delivery time has expired, immediately forwarding the packets to the virtual machine or container identified by the network address in the second header field; and transmitting, via the computer network, data representing a request to increase an estimated latency of transmitting the packets from the source host to the multiple servers hosting the identified virtual machines or containers.

4. The method of claim 1 wherein performing the comparison includes:

performing the comparison of the identified delivery time to the system time at the multiple servers hosting the identified virtual machines or containers to determine whether the delivery time has expired; and in response to determining that the delivery time has not expired, calculating a difference between the delivery time and a time of arrival based on the system time at the each of the servers;

determining whether the calculated difference between the time of arrival and the delivery time exceeds a delay threshold; and in response to determining that the calculated difference exceeds the delay threshold, transmitting a notification indicating excessive delay between a time of receiving the packets and the delivery time.

5. The method of claim 1 wherein performing the comparison includes:

performing the comparison of the identified delivery time to the system time at the multiple servers hosting the identified virtual machines or containers to determine whether the delivery time has expired; and in response to determining that the delivery time has not expired, calculating a difference between the delivery time and a time of arrival based on the system time at the multiple servers hosting the identified virtual machines or containers; and transmitting, via the computer network, the calculated difference between the delivery time and the time of arrival.

6. The method of claim 1 wherein storing the received packets in the buffer includes storing the received packets in at least one of:

a network switch interconnected to the multiple servers hosting the identified virtual machines or containers;

a network interface card on the multiple servers hosting the identified virtual machines or containers;

a field programmable gate array coupled to the network interface card on the multiple servers hosting the identified virtual machines or containers;

a hypervisor on the multiple servers hosting the identified virtual machines or containers; or an operating system on the multiple servers hosting the identified virtual machines or containers.

7. The method of claim 1 wherein performing the comparison of the identified delivery time to the system time at the multiple servers hosting the identified virtual machines or containers includes performing the comparison of the identified delivery time to a local system time at the multiple servers hosting the identified virtual machines or containers or a platform system time at the distributed computing system.

8. The method of claim 1 wherein:

performing the comparison of the identified delivery time to the system time at the multiple servers hosting the identified virtual machines or containers includes performing the comparison of the identified delivery time to a local system time at the multiple servers hosting the identified virtual machines or containers; and the method further includes synchronizing the local system time at the multiple servers hosting the identified virtual machines or containers with a remote reference clock.

9. A computing device connectable to other computing devices in a distributed computing system via a computer network, comprising:

a processor; and a memory containing instructions executable by the processor to provide an operating system and one or more applications executing on the computing device, the memory also including additional instructions executable by the processor to cause the computing device to:

receive, via the computer network, a packet from another computing device in the distributed computing system, the received packet including:

a header with a first header field containing data representing a delivery time and a second header field containing data representing a network address identifying one of the applications executing on the computing device; and a payload containing data representing a copy of information transmitted to the identified application and to other applications executing on other computing devices in the distributed computing system; and inspect the data in the header field of the received packet to identify the delivery time;

perform a comparison of the identified delivery time to a system time at the computing device; and based on the performed comparison, temporarily store the received packet in a buffer without allowing access to the received packet to the identified application identified by the network address in the second header field prior to the identified delivery time being expired, thereby preventing the identified application from accessing the information in the payload of the packet prior to the identified delivery time being expired; and allowing the packets or the payload of the packets to be accessed by the identified application after expiration of the delivery time, thereby providing time-sensitive data delivery of the copies of the same information in the payload to the identified application.

10. The computing device of claim 9 wherein to perform the comparison includes to:

determine whether the delivery time has expired; and in response to determining that the delivery time has expired, immediately allow the identified application to access to the packet; and transmit data representing a report indicating that the packet has arrived after the delivery time has expired.

11. The computing device of claim 9 wherein to perform the comparison includes to:

determine whether the delivery time has expired; and in response to determining that the delivery time has expired, immediately allow the identified application to access the packet; and transmit data representing a request to increase an estimated latency of transmitting the packet from the second computing device to the computing device.

12. The computing device of claim 9 wherein to perform the comparison includes to:

determine whether the delivery time has expired; and in response to determining that the delivery time has not expired, calculate a difference between the delivery time and a time of arrival based on the system time at the computing device;

determine whether the calculated difference between the time of arrival and the delivery time exceeds a delay threshold; and in response to determining that the calculated difference exceeds the delay threshold, transmit a notification indicating excessive delay between a time of receiving the packet and the delivery time.

13. The computing device of claim 9 wherein:

to perform the comparison of the identified delivery time to the system time includes performing the comparison of the identified delivery time to a local system time at the computing device; and the memory includes further instructions executable by the processor to cause the computing device to synchronize the local system time at the computing device with other computing devices in the distributed computing system.

14. A computer-readable storage medium having computer-executable instructions stored thereupon which, when executed by one or more processors of a computing device, cause the computing device to perform operations comprising:

receiving, at multiple servers in a distributed computing system having a plurality of servers interconnected by a computer network, packets from a source host, the packets individually having:

a header with a first header field containing data representing a delivery time and a second header field containing data representing a network address identifying a virtual machine or container hosted on the multiple servers; and a payload containing data representing copies of information destined to the identified virtual machines or containers hosted at the multiple servers;

in response to receiving the packets, at the multiple servers hosting the identified virtual machines or containers:

inspecting the data in the header field to identify the delivery time;

performing a comparison of the identified delivery time to a system time at the servers hosting the identified virtual machines or containers;

based on the performed comparison, storing the received packets in a buffer at the multiple servers hosting the identified virtual machines or containers without allowing the received packets to be accessed by the virtual machine or container identified by the network address in the second header field prior to the identified delivery time being expired, thereby preventing the virtual machine or container hosted at a first of the multiple servers hosting the identified virtual machines or containers from accessing the information in the payload of the packets earlier than another virtual machine or container hosted at a second of the multiple servers hosting the identified virtual machines or containers; and allowing the packets or the payload of the packets to be accessed by the identified virtual machines or containers after expiration of the delivery time, thereby providing time-sensitive data delivery of the copies of the same information in the payload to the identified virtual machines or containers.

15. The computer-readable storage medium of claim 14 wherein performing the comparison includes:

performing the comparison of the identified delivery time to the system time at the multiple servers hosting the identified virtual machines or containers to determine whether the delivery time has expired; and in response to determining that the delivery time has expired, immediately forwarding the packets to the virtual machine or container identified by the network address in the second header field; and transmitting data representing a report indicating that the packets have arrived after the delivery time has expired.

16. The computer-readable storage medium of claim 14 wherein performing the comparison includes:

performing the comparison of the identified delivery time to the system time at the multiple servers hosting the identified virtual machines or containers to determine whether the delivery time has expired; and in response to determining that the delivery time has expired, immediately forwarding the packets to the virtual machine or container identified by the network address in the second header field; and transmitting, via the computer network, data representing a request to increase an estimated latency of transmitting the packets from the source host to the multiple servers hosting the identified virtual machines or containers.

17. The computer-readable storage medium of claim 14 wherein performing the comparison includes:
- performing the comparison of the identified delivery time to the system time at the multiple servers hosting the identified virtual machines or containers to determine whether the delivery time has expired; and
- in response to determining that the delivery time has not expired,
- calculating a difference between the delivery time and a time of arrival based on the system time at the multiple servers hosting the identified virtual machines or containers;
- determining whether the calculated difference between the time of arrival and the delivery time exceeds a delay threshold; and
- in response to determining that the calculated difference exceeds the delay threshold, transmitting a notification indicating excessive delay between a time of receiving the packets and the delivery time.

18. The computer-readable storage medium of claim 14 wherein performing the comparison includes:
- performing the comparison of the identified delivery time to the system time at the multiple servers hosting the identified virtual machines or containers to determine whether the delivery time has expired; and
- in response to determining that the delivery time has not expired,
- calculating a difference between the delivery time and a time of arrival based on the system time at the multiple servers hosting the identified virtual machines or containers; and
- transmitting, via the computer network, the calculated difference between the delivery time and the time of arrival.

\* \* \* \* \*